United States Patent

Joby

[11] 4,418,529
[45] Dec. 6, 1983

[54] FUEL SYSTEMS FOR GAS TURBINE ENGINES

[75] Inventor: Michael J. Joby, Solihull, England

[73] Assignee: Lucas Industries Limited, Birmingham, England

[21] Appl. No.: 188,211

[22] Filed: Sep. 17, 1980

[30] Foreign Application Priority Data

Sep. 21, 1979 [GB] United Kingdom ............... 7932879

[51] Int. Cl.³ .............................................. F02C 9/28
[52] U.S. Cl. ............................................. 60/39.281
[58] Field of Search .............................. 60/39.28 R

[56] References Cited

U.S. PATENT DOCUMENTS

| | | | |
|---|---|---|---|
| 3,045,426 | 7/1962 | Brahm | 60/39.28 R |
| 3,082,954 | 3/1963 | Offner | 60/39.28 R |
| 3,686,859 | 8/1972 | White | 60/39.28 R |
| 3,739,250 | 6/1973 | Beadman | 60/39.28 R |
| 4,018,044 | 4/1977 | Joby et al. | 60/39.28 R |
| 4,188,781 | 2/1980 | Johnson et al. | 60/39.28 R |
| 4,217,754 | 8/1980 | Schmidt-Roedenbeck | 60/39.28 R |

FOREIGN PATENT DOCUMENTS 1465477 2/1977 United Kingdom ........... 60/39.28 R

Primary Examiner—L. J. Casaregola
Attorney, Agent, or Firm—Trexler, Bushnell & Wolters, Ltd.

[57] ABSTRACT

A gas turbine engine fuel control has a main hydromechanical fuel flow control and an electrically operable valve in series with the flow control for speed limitation purposes. The valve is controlled by a signal $N_L$ or $N_H$ derived from an engine speed transducer. A phase advance compensation circuit advances the phase of the transducer signal and its output is applied to an error amplifier which compares it with a datum (which may vary with altitude). The error signal is applied to a non-linear amplifier the amplification factor of which increases when a certain error threshold is exceeded. The combination of phase advance and non-linear amplification ensures rapid limitation of speed without introducing stability problems.

3 Claims, 2 Drawing Figures

FUEL SYSTEMS FOR GAS TURBINE ENGINES

This invention relates to fuel systems for gas turbine engines, of the kind including an hydromechanical speed governor fuel flow control and an electrically operable valve in series with the fuel flow control and operable to limit the engine speed.

With such a system, when the hydromechanical fuel flow control receives a control input, e.g. from a pilot's lever, demanding a speed in excess of the permitted limit at the existing altitude of the aircraft in which the engine is installed, the engine will speed up until it reaches the limit and the electrically operable valve then starts to close. The hydromechanical fuel flow control will, however, start opening to try to maintain speed and closing of the electrically operable valve will be ineffective until the hydromechanical fuel flow control reaches the end of its range of travel. This delay will allow the engine speed to go on increasing and if the overspeed condition persists or is occurring as a result of malfunction, damage could occur.

Some improvement of the situation can be obtained by utilizing a phase advance compensation circuit in the control circuit of the electrically operable valve, but the amount of phase advance which can be introduced is limited by stability considerations—i.e., the introduction of excessive phase advance will lead to oscillation of the system.

In accordance with the present invention there is provided a fuel system of the kind specified including a control circuit for the electrically operable valve which includes a phase advance compensation circuit for advancing the phase of incoming signals to the control circuit from an engine speed transducer and an amplifier having a nonlinear amplification characteristic such that its amplification factor is increased significantly when the input thereto representing error between the phase compensated speed signal and a limit signal exceeds a predetermined level.

An example of the invention is shown in the accompanying drawings in which.

Figure 1:
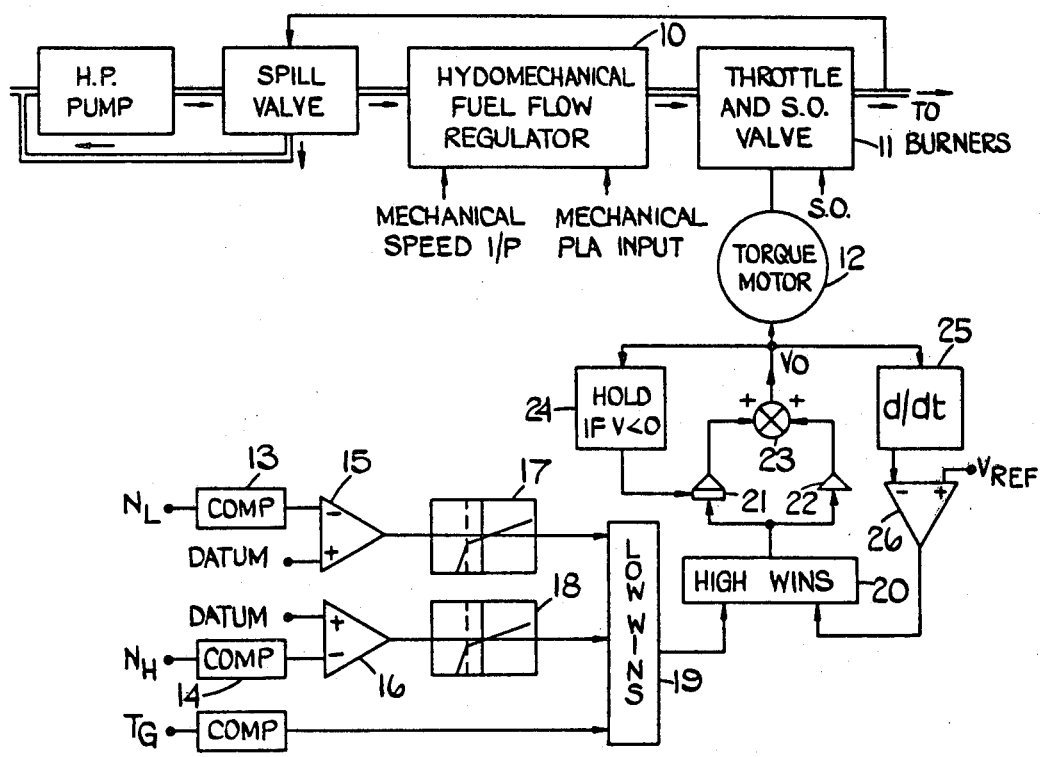
FIG. 1 is a diagrammatic representation of the control system.

Referring firstly to FIG. 1, the control system includes an hydromechanical speed governor fuel flow control 10 which is basically as described in U.K. Patent specification No. 1,465,477. The control 10 includes a mechanical speed input from the engine being controlled and also a mechanical input from a pilots control lever, the control 10 operating to provide a balance between these inputs, by varying the fuel flow to the engine.

A throttle valve 11 is arranged in series with the control 10 and is controlled by a torque motor 12, both of which are described in specification No. 1,465,477.

The torque motor 12 is controlled by an electronic circuit and acts to limit the speed of the engine being controlled by causing the valve 11 to restrict fuel flow when a predetermined engine speed is reached. In the present example the engine being controlled has two spools and electrical signals $N_L$ and $N_H$ representing the speeds of these two spools are fed into the circuit. The circuit includes two phase advance compensation circuits 13, 14 of known form via which the $N_L$ and $N_H$ signals are supplied to two error amplifiers 15, 16 respectively. Each error amplifier is also supplied with an appropriate datum signal so that in steady state the output of each amplifier 15, 16 is proportional to error between the actual spool speed and the limit speed represented by the datum signal.

The circuit also includes two dual gain amplifier circuits 17, 18 connected to the outputs of the error amplifiers 15, 16 respectively. Each such circuit 17, 18 has a relatively low gain whenever the error signal is of positive polarity or is of small magnitude and negative polarity. When the error is negative and of magnitude greater than a threshold level the gain of each amplifier 17, 18 becomes significantly higher.

The outputs of amplifiers 17 and 18 are combined via a "low wins" gate 19 which also has another input from a temperature limit circuit of no relevance to the present invention. The output of the "low wins" gate is connected to one input of a "high wins" gate 20, the output of which is connected to a proportional-plus-integral circuit comprising an integrator 21, a linear amplifier 22 and a summing circuit 23. The output of the summing circuit 23 is applied to the torque motor 12 (via a power amplifier not shown). A hold circuit 24 is connected to the output of the summing circuit and to a reset input of the integrator 21 to hold the output of the integrator 21 if the output of the summing circuit is negative. A differentiator 25 has its input connected to the output of the summing circuit 23 and its output connected to one input of an error amplifier 26 the other input of which is connected to a reference voltage and the output of which is connected to an input of the "high wins" gate 20.

When the spool speeds are both below their respective limits, the outputs of both error amplifiers will be positive so that the output of gate 19 will be a positive signal and will win gate 20, the signal from amplifier 26 being negative in these conditions. The output of the proportional-plus-integral circuit will be negative so that the hold circuit 24 will be effective to prevent integration of the error signal. If the pilot now moves his control lever to a position representing a demanded speed in excess of either limit, the engine will accelerate until one or other of the amplifiers 15, 16 produces a negative signal. This will occur slightly before the actual speed exceeds the limit as a result of the phase advance compensation circuit. This negative output will win the gates 19 and 20 and will cause the torque motor current to start to rise. As mentioned above, however, initial closing movement of the valve 11 will have no effect on the engine because the control 10 will merely open up to allow more fuel through.

When the amplifier 17, 18 input exceeds the threshold referred to above, however, and its gain becomes relatively high, the torque motor current will increase very rapidly and overshoot of the speed will be minimal.

Figure 2:
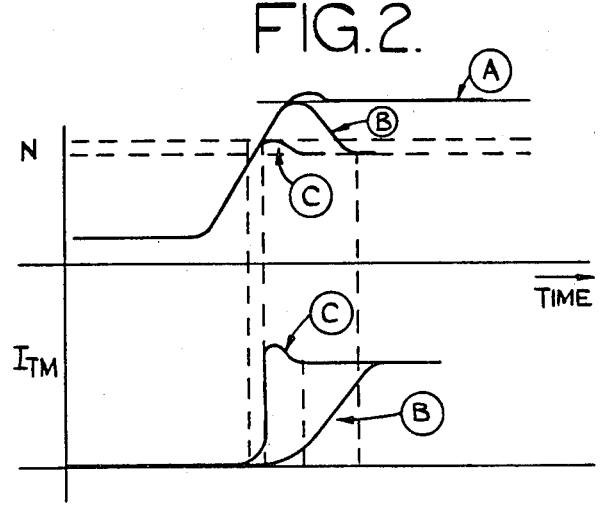
FIG. 2 is a graph showing the effect of the invention.

In FIG. 2 the upper graph shows engine speed against time and the lower graph torque motor current against time. The curve A in FIG. 2 shows the action of the control without any speed limiting and the curves B shows the performance of the control without phase advance compensation or dual gain error amplification. As will be seen the torque motor current builds up only slowly after the speed limit has been exceeded allowing considerable overshoot. Curves C show performance of the circuit as described above in which the combination of phase advance compensation and dual gain error amplification ensure rapid limiting of speed without overshoot, but without introducing any oscillatory instability.

The differentiator 25 and error amplifier 26 operate to limit the rate of reduction of the torque motor current when engine power is being reduced. This prevents engine stall in the transition between limiter operation back to the normal hydromechanical control.

I claim:

1. A gas turbine engine fuel system comprising the combination of an hydromechanical speed governor fuel flow control, an electrically operable valve in series with the fuel flow control, and a control circuit connected to said electrically operable valve comprising a phase advance compensation circuit for advancing the phase of incoming signals from an engine speed transducer, said phase advance compensating circuit having input means for receiving said incoming signals, differential amplifier means connected to said phase advance compensating circuit and to a limit signal, and an amplifier connected to said differential amplifier means and having a non-linear transfer characteristic such that its amplification factor is increased significantly when the input thereto representing the error between the phase compensated speed signal and a limit signal exceeds a predetermined level, said amplifier providing an electrical output connected to and controlling said electrically operable valve.

2. A gas turbine engine fuel system as set forth in claim 1 wherein said non-linear transfer characteristic amplifier is connected to said electrically operable valve by circuit means including differentiator feed back means to limit the reduction of current upon reduction of engine power.

3. A gas turbine engine fuel system as set forth in claim 1 wherein said non-linear transfer characteristic amplifier is connected to said electrically operable valve by circuit means including a summing circuit connected to said electrically operable valve and fed in parallel by a linear amplifier and an integrator, and further including a feedback circuit including a hold circuit from the output of said summing circuit to said integrator to prevent integration of the error signal if the summing circuit has a negative output.

* * * * *